G. S. JACOBS.
TRACTOR ATTACHMENT FOR AUTOMOBILES.
APPLICATION FILED NOV. 1, 1916.

1,335,836.

Patented Apr. 6, 1920.
2 SHEETS—SHEET 1.

Witness
Chas. W. Stauffiger
Anna M. Dorr

Inventor
George S. Jacobs,
By Barthel & Barthel
Attorneys

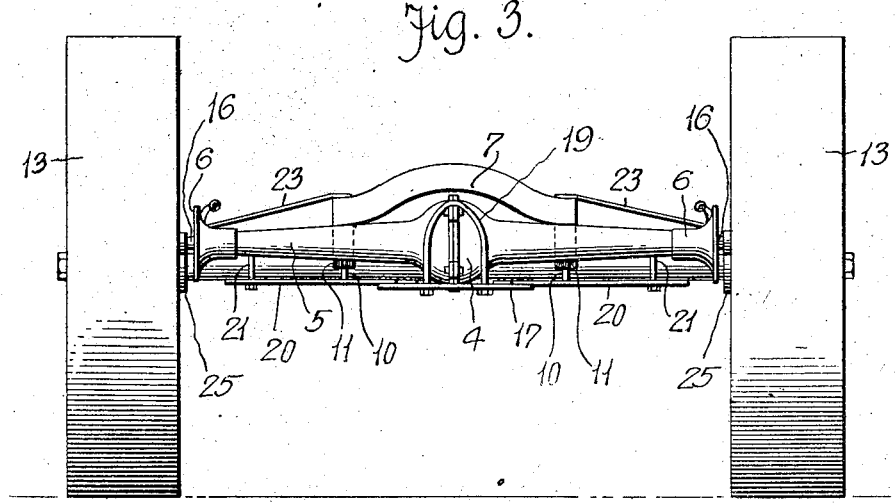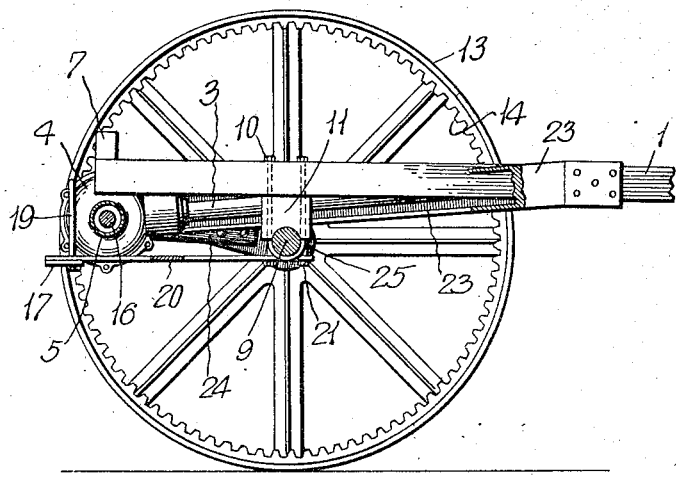

UNITED STATES PATENT OFFICE.

GEORGE S. JACOBS, OF DETROIT, MICHIGAN, ASSIGNOR TO STANDARD DETROIT TRACTOR CO., OF DETROIT, MICHIGAN, A CORPORATION OF MICHIGAN.

TRACTOR ATTACHMENT FOR AUTOMOBILES.

1,335,836.  Specification of Letters Patent.  Patented Apr. 6, 1920.

Application filed November 1, 1916. Serial No. 128,840.

*To all whom it may concern:*

Be it known that I, GEORGE S. JACOBS, a citizen of the United States of America, residing at Detroit, in the county of Wayne and State of Michigan, have invented certain new and useful Improvements in Tractor Attachments for Automobiles, of which the following is a specification, reference being had therein to the accompanying drawings.

This invention relates to a tractor attachment for automobiles whereby a car of standard touring or roadster type is converted readily into a tractor capable not only of carrying considerable load but of drawing heavy trailers.

The invention includes means whereby the change may be made from a standard equipment of the car to the tractor form without difficulty and change in any of the control mechanism, the motor end of the car being undisturbed so that the yielding springs protect the engine to a large degree from road shock.

The invention consists in the matters hereinafter set forth, and more particularly pointed out in the appended claims.

In the drawings,

Fig. 3 is a view in end elevation of an automobile and attachment; and

Fig. 4 is a view in sectional detail.

Figure 1:
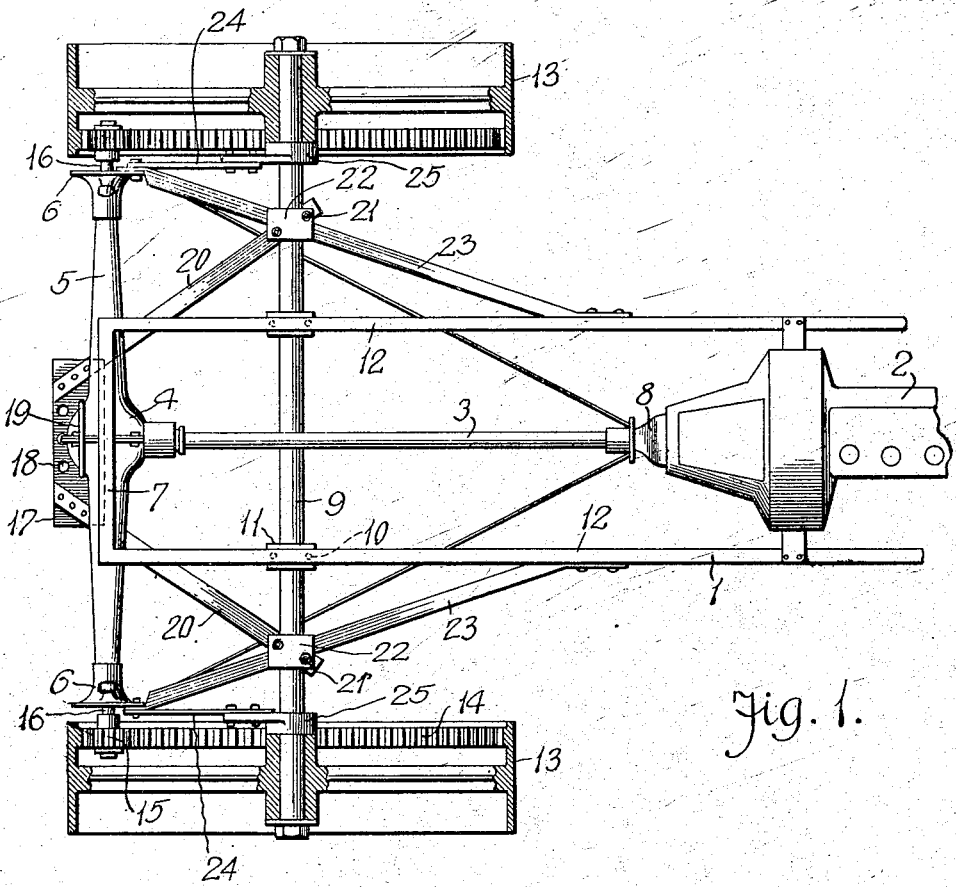
Figure 1 is a plan, partially broken away and in section, of an automobile of standard type with a tractor attachment that embodies features of the invention.
Figure 2:
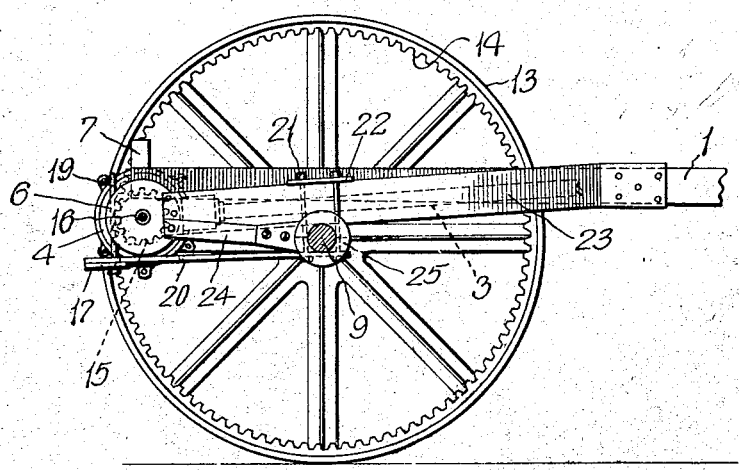
Fig. 2 is a view in side elevation thereof, partially broken away and in section.

As herein shown, a chassis 1 of an automobile of standard type, the forward end portion of which carries a power plant indicated diagrammatically at 2 and is mounted in approved manner on bearing springs, not indicated, has a rearwardly extending torque tube 3 which also houses the connections between the power plant and the mechanism carried in the differential casing 4 of the rear axle 5. The housing of this axle terminates in flange heads 6. Normally the flanges 6 carry the spring shackles by which a transverse spring is secured on the axle in such manner as to seat the cambered end piece 7 of the chassis.

In equipping the car with the device, the torque tube 3 which is connected at 8 with the power plant by a ball and socket or equivalent connection, is swung up against the chassis and a fixed axle 9 is secured across the car beneath it, as by clips 10 and blocks 11 resting on the shaft and bearing upward against the side members 12 of the chassis. Traction bearing wheels 13 of approved type and tread appropriate for the purpose of a tractor, are independently journaled on the end portions of the shaft 9, each carrying an internal gear 14. A driving pinion 15 on each end of the differential member 16 of the rear axle shaft meshes with the companion internal gear. As the shaft 9 is stationed forward of the axle 5, this arrangement drives the traction wheels normally forward in the customary manner.

A draft plate 17 with clevis holes 18 therethrough, is supported on the differential housing 4 as by a U-bolt 19 and is rigidly connected to the shaft 9 by forwardly extending links 20 that are riveted or otherwise secured to the plate 17 and are connected to the shaft 9 as by appropriate bolts 21 and plate 22, preferably at the point of intersection and connection of the shaft 9 with forwardly extending members 23 which likewise connect the flange heads 6 of the axle housing 5 with the side members 12 of the chassis.

It is understood that the members connecting the brace rods with the chasis frame are of commercial sections, iron or steel, flanged if necessary, not only to secure strength and rigidity, but also to afford proper connection with the channel bars and like portions of the chassis.

In order to further stiffen the construction and also to hold the gears and pinions rigidly in line, links 24 connect each flange member 6 with the end portion of the shaft 9, preferably by means of collars 25 encircling the shaft, the latter acting as thrust members for the traction wheels.

As a result of this construction a tractor attachment is had that is quickly applied to a light touring car of well known type in such manner as to utilize the regular mechanism of the car to produce the desired variations in speed while at the same time the construction is sufficiently rigid, to enable the car to carry a very heavy load. As the forward portion of the chassis is not disturbed the spring supports of the motor plant are not disarranged, and therefore the latter is not subject to shock.

Obviously, changes in the details of construction may be made without departing from the spirit of my invention and I do not care to limit myself to any particular form or arrangement of parts.

What I claim is:—

1. As a means for transforming an automobile into a tractor by removal of the automobile drive wheels, and wherein the automobile is normally provided with drive wheels and a main driving axle including a rear axle housing connected to the forward power plant by a torque tube pivotally connected at the forward end to the housing, said means comprising a main shaft adapted to be rigidly secured to the chassis between the power plant and the rear axle, means for rigidly supporting the rear axle against the sides of the chassis, draft bar connections extending rearwardly of the housing and forwardly to the chassis frame, traction wheels journaled on the transverse shaft end portions, and gearing connecting each traction wheel with a differential drive member of the rear axle.

2. As a means for transforming an automobile into a tractor by removal of the automobile drive wheels, and wherein the automobile is normally provided with drive wheels, a chassis, and a rear driving axle embodying differential mechanism and shaft housed in a casing and articulated by a torque tube through a pivotal connection with the forward portion of the chassis, said means comprising a shaft rigidly secured to the chassis between the driving axle and the power plant, means for securing the rear driving axle rigidly against the under side of the rear portion of the chassis, traction bearing wheels each journaled on an extremity of the shaft, internal gearing carried by the traction bearing wheels, pinions on the differential shaft of the rear axle each in mesh with a companion wheel gear, and draft rigging secured to the rear axle and connected by brace members to the forward portion of the chassis.

3. As a means for transforming an automobile into a tractor by removal of the automobile drive wheels, and wherein the automobile is normally provided with drive wheels and a main driving axle including a rear axle housing connected to the forward power plant by torsion members and a differential shaft in the housing, comprising a main shaft rigidly secured to the chassis forward of the rear axle, means for rigidly supporting the rear axle on the chassis, traction wheels journaled on the main shaft end portions, a gear carried by each traction wheel, a pinion secured to each differential shaft section in mesh with a traction wheel gear, a radius member connecting the end portion of each differential shaft section with the corresponding adjacent portion of the main shaft, and means detachably connecting the end portions of the housing of the rear axle with the chassis.

4. As a means for transforming an automobile into a tractor by removal of the automobile drive wheels, and wherein the automobile is normally provided with drive wheels, a chassis having a spring-supported forward portion, and a rear axle housing connected by torsion members to the chassis and normally connected directly to the chassis by spring means, said means comprising means for rigidly securing the rear axle to the chassis when the spring support is removed, draft rigging supported on the rear axle and connected by rigid members to the axle, a main shaft rigidly secured to the chassis parallel to and in front of the rear axle, radius members rigidly connecting the outer portion of the shaft with the rear axle, traction bearing wheels journaled on the end portions of the shaft, a gear on each traction wheel and pinions each adapted to be mounted on the drive shaft member of the rear axle in mesh with a traction wheel gear.

5. As a means for transforming an automobile into a tractor by removal of the automobile drive wheels, and wherein the automobile is normally provided with a power plant, a rear axle, power transmission means connecting the power plant and the rear axle, and a main frame mounted above the rear axle, said means including a dead axle, side and rear members, the dead axle being located in advance of the rear axle and fixedly secured to the side members and the main frame, the side members being secured to the main frame forward of the dead axle, and extending to the rear to parts associated with the rear axle, and the rear members being secured to parts associated with the dead axle and the rear axle, traction wheels rotatably mounted on the dead axle and driving means on the rear axle for rotating the traction wheels.

6. As a means for transforming into a tractor an automobile having its drive-wheels mounted on a differential-carrying drive axle construction, and wherein such axle construction is utilized in the tractor by removal of the drive wheels, said means including pinions positioned on the normal drive wheel supports and driven through the normal drive, a dead axle secured to the chassis in advance of the normal drive axle, and traction wheels carried by the dead axle and having internal gear faces, said dead axle being positioned to produce a drive gear relation between the pinions and gear faces while maintaining the normal activity of the differential structure to permit differential movement of the traction wheels.

7. In a machine of the class described, the combination with a longitudinally extending framework, the rear axle and the axle housing, of a transversely extending bearing rod lying in advance of the rear axle, a spacer bar between each end of the bearing rod and the adjacent end of the axle housing, a draft plate, a pair of draft connections from the bearing rod to the draft plate, a driving wheel on each end of the bearing rod, an annular gear within each driving wheel, and a pinion on each end of the rear axle meshing with the corresponding annular gear.

In testimony whereof I affix my signature in the presence of two witnesses.

GEORGE S. JACOBS.

Witnesses:
LEWIS E. FLANDERS,
ANNA M. DORR.